United States Patent

[11] 3,588,144

| [72] | Inventor | Guillermo Solomon Padial<br>Apartado 13068, Madrid, Spain |
|---|---|---|
| [21] | Appl. No. | 814,746 |
| [22] | Filed | Apr. 9, 1969 |
| [45] | Patented | June 28, 1971 |

[54] CYCLE CONSTRUCTION
12 Claims, 9 Drawing Figs.

| [52] | U.S. Cl. | 280/236, 280/252, 280/276, 280/278 |
|---|---|---|
| [51] | Int. Cl. | B62m 11/04 |
| [50] | Field of Search | 280/252, 236 |

[56] References Cited

UNITED STATES PATENTS

| 87,630 | 3/1869 | Burns | 280/252 |
|---|---|---|---|
| 661,630 | 11/1900 | Allen | 280/252 |

FOREIGN PATENTS

| 811,916 | 10/1936 | France | 280/252 |
|---|---|---|---|

*Primary Examiner*—Kenneth H. Betts
*Assistant Examiner*—Robert R. Song
*Attorneys*—Sylvester J. Liddy, John J. Hart, Joe E. Daniels and Charles E. Baxley ABSTRACT: The cycle comprises a saddle mounted on its frame to the rear of the handlebars and a pedaling mechanism mounted on its frame in front of the handlebars, the pedaling mechanism being of a reciprocating construction and connected to the rear wheel by lengths of driving chain.

INVENTOR.
GUILLERMO SOLOMON PADIAL

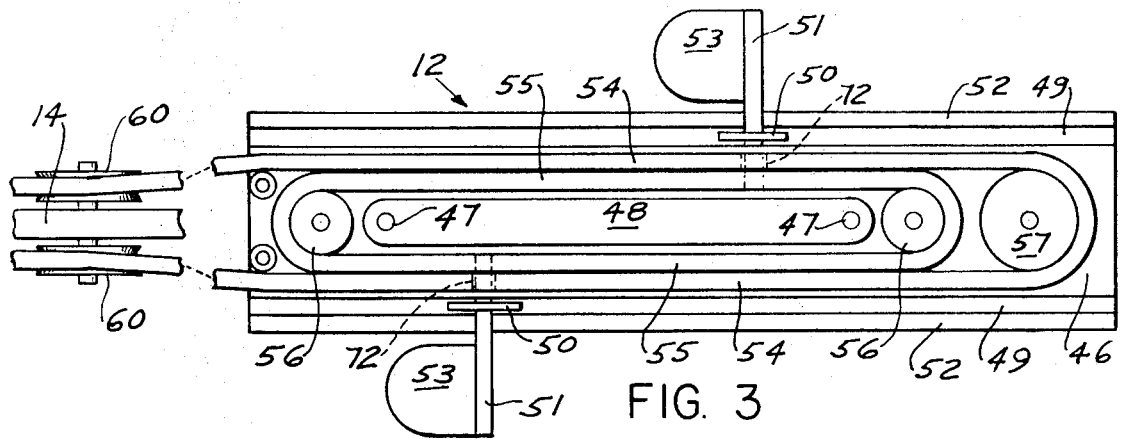
FIG. 3
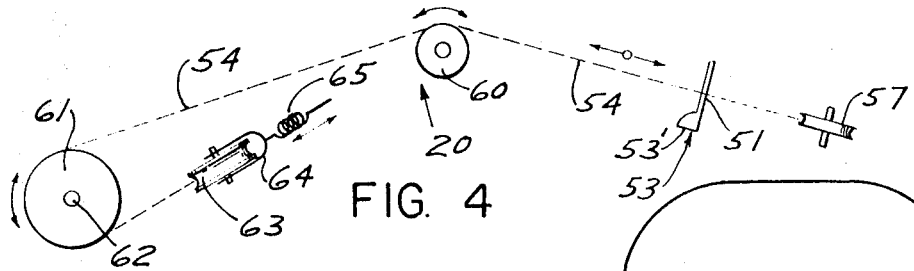
FIG. 4
FIG. 7
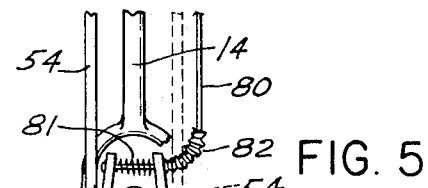
FIG. 5
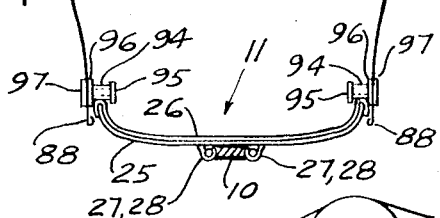
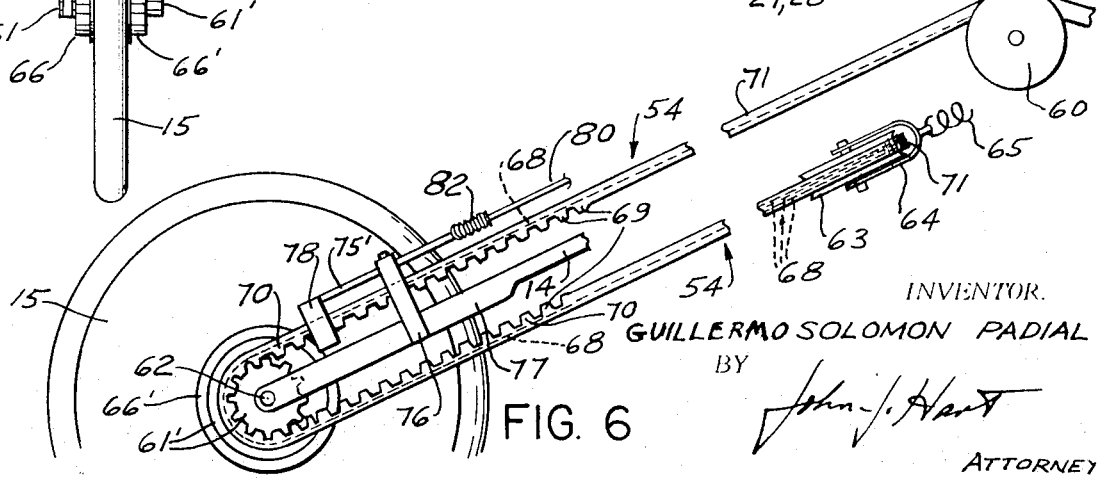
FIG. 6
INVENTOR.
GUILLERMO SOLOMON PADIAL
BY
John J. Hart
ATTORNEY

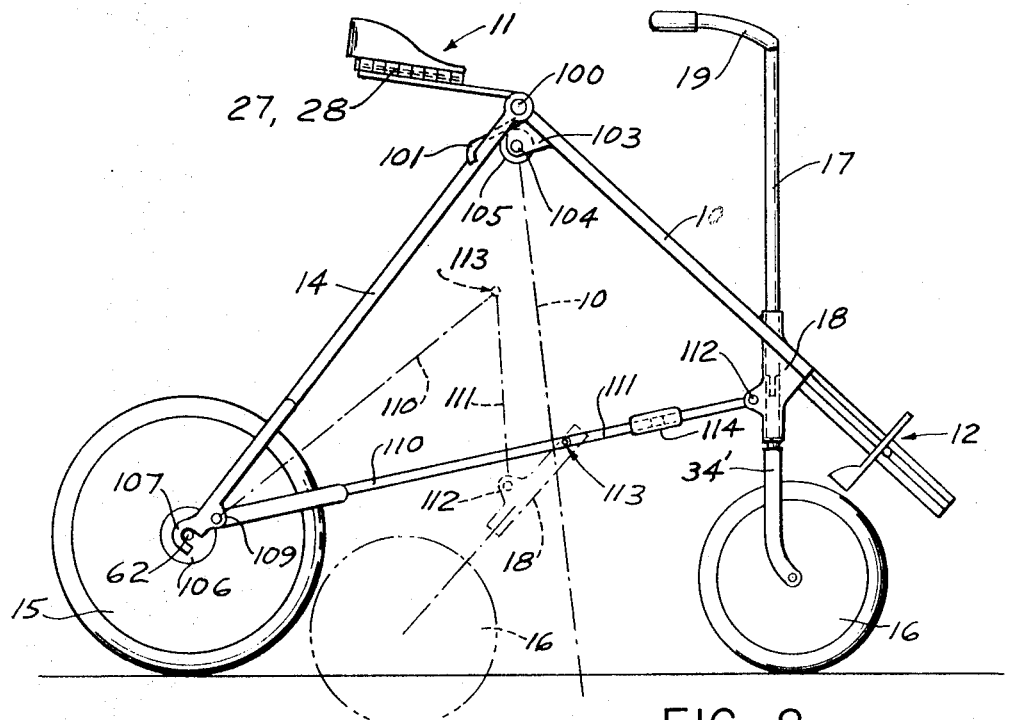

CYCLE CONSTRUCTION

This invention relates to bicycles and its primary object is to provide an improved cycle construction of simpler design and lighter weight than is presently available.

Another object of the invention is to provide a cycle construction which requires the rider to assume a different operating stance than is employed in the operation of conventional bicycles.

A further object is to provide a bicycle with an improved, more efficient propelling system than the usual rotary system embodied in conventional bicycles.

A still further object of the invention is to provide an improved cycle frame construction which may be readily adaptable to the construction of portable bicycles.

Other objects of the invention, as well as the features of novelty thereof, will become more apparent from the following description, when read in connection with the accompanying drawings in which FIG. 1 is a side elevational view of a bicycle embodying the invention; the canopy being broken away for the sake of clearness;

FIG. 3 is a top plan view of the pedaling mechanism with the top plate thereof and frame member eliminated to show the interior of such mechanism;

FIG. 4 is a schematic view showing the manner in which the pedaling mechanism drives the rear wheel;

FIG. 5 is an enlarged rear elevational view of the rear wheel and associated parts, with portions of the latter being omitted for the sake of clearness;

FIG. 6 is a side elevational view of the parts shown in FIG. 5;

FIG. 7 is a vertical sectional view of the canopy in the region of the seat;

FIG. 8 is a schematic, side elevational view of a modified form of the invention; and FIG. 9 is a rear elevational view showing the frame members made of tubings.

Figure 1:
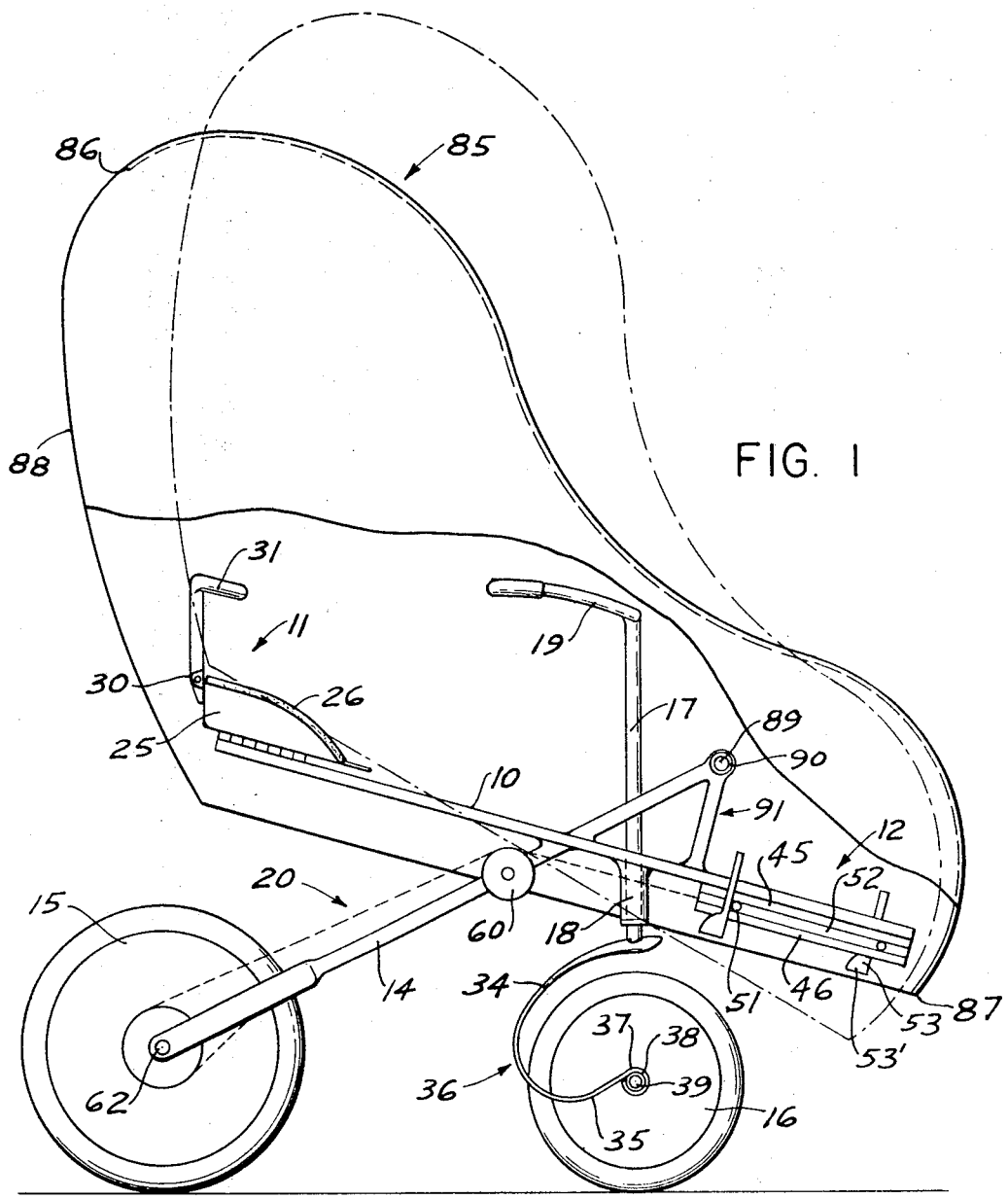

In the drawings, the numeral 10 designates a substantially straight inclined frame member on the upper end of which is mounted the bicycle seat or saddle which is generally designated 11, and on the lower end of which is mounted the pedaling mechanism which is generally designated 12. In the embodiment shown in FIG. 1, the frame member 10 has connected thereto approximately midway of its length, the upper end of a rearwardly and downwardly inclined frame member 14 to the lower end of which is attached the rear wheel 15. The frame members 10 and 14 may be made from a single piece of material or from several pieces of material and form a body frame which has a profile resembling a horizontally disposed Y(⊁). The frame members 10 and 14 are made of resilient metal having a flat cross-sectional configuration to enable them to develop an inherent springing action during the operation of the cycle. A chain system generally designated 20 drivingly connects the pedaling mechanism 12 to the rear wheel 15. The front wheel 16 is mounted on the lower end of a steering column 17 which extends through a sleeve 18 and which has provided on its upper end the handle bars 19. In the embodiment of FIG. 1, the sleeve 18 depends from the frame member 10 at a place located between the pedaling mechanism 12 and the connection of such frame member to the frame member 14. The lower end of the steering column 17, below the sleeve 18 is connected to the upper end of a front wheel fork 34 composed of a steel strip which has a generally arcuate lengthwise configuration and is split upwardly from its bottom to the point 36 to form the two lower side legs 35 between which is located the wheel 16. Above the point 36 the fork 34 has a concave cross section, while below such point the side legs 35 thereof have a flatter cross-sectional form. The lower ends of the side legs 35 are each formed into a circular housing 37 for the front wheel shaft bushings 38. The ends 39 of the front wheel shaft contained in the bushings 38 and the inner lining configuration of the latter are conically shaped and without threads, the association of such parts being maintained by the inherent tendency of the side legs 35 to resist any pressure tending to separate the terminal housing portions 37 thereof. It will be understood that as a result of this construction what is provided is in effect a suspension system for the front wheel 16. Thus, when the wheel 16 hits a road bump, the side legs 35 will flex and permit the wheel to yieldingly give upwardly; the increased tension created in the resilient fork returning the wheel to normal positions as soon as the force caused by the bump has be expended. As shown, the front wheel 16 is of smaller diameter than the rear wheel to permit of easier steering movement without the front wheel coming into contact with the cyclist's shoes as he is operating the pedaling mechanism 12. It will also be noted that the pedaling mechanism 12 is located above the periphery of the front wheel and above the level of both front and rear wheel axles.

It is believed advisable to point out generally at this time that the pedaling mechanism 12 is of a reciprocating type, and that the chain system 20 is constructed to drive the rear wheel 15 on each forward actuation of such pedaling mechanism and to recover without effecting the forward or clockwise rotational movement of such rear wheel on the retraction of the pedaling mechanism. It will be understood that in operating a bicycle of this construction, the legs of the cyclist will be so positioned that when the pedaling mechanism is fully advanced so that they are fully extended, his legs will be almost horizontal instead of being almost vertical as in the case with conventional bicycles provided with the usual rotary movement. It has been found that this reciprocating method of pedaling is a more efficient one than the method employed in pedaling conventional bicycles.

Figure 2:
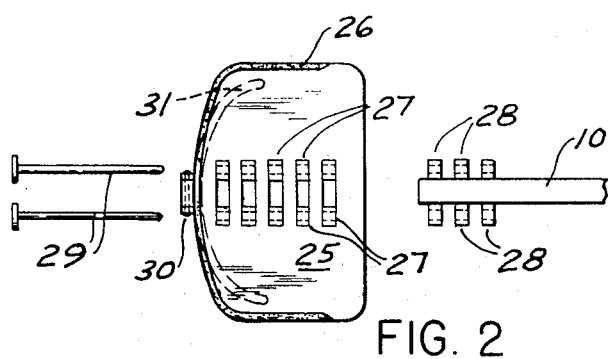
FIG. 2 is a bottom exploded view of the saddle and portion of the frame member on which it is mounted.

Considering now certain of the aforesaid features more in detail, as is shown in FIGS. 2 and 3 of the drawings, the seat or saddle 11 is made from a piece 25 of stamped steel sheeting on the upper side of which is secured suitably formed upholstery 26. It will be noted that the seat is rather wide and short, with a width almost twice its length, and has a deep rear portion and no saddle nose, all of which facilitate the cyclist's operation of the pedaling mechanism 12. In the formation of the seat base 25, there is providing in the sheeting thereof during the stamping operation, two, spaced, parallelly disposed half hinges 27,27 to which are connnected two half hinges 28,28 by pins 29,29. The half hinges 28,28 are secured to the frame bar 10 in any suitable manner, as by spot welding and are substantially shorter than the half hinges 27,27 so that they may be adjustably positioned on the latter to adjust the position of the saddle relative to the pedaling mechanism 12. Connected by a hinge 30 provided on the back of the seat base 25 is a collapsible back rest 31. The hinge 30 is constructed to enable the back rest 31 to pivot forwardly until the upper portion thereof rests on the frame bar 10 and to prevent rearward pivotal movement of the back rest 31 when the latter is in its raised or operable position as shown in FIG. 1 of the drawings.

The pedaling mechanism 12 as is shown in FIGS. 1 and 3, comprises a pedal guide constituted of a top plate 45 fixedly secured to the underside of the frame bar 10 forwardly of the steering column sleeve 18 in any suitable manner, as by bolts or spot welding. A bottom plate 46 is secured to the top plate 45 in any suitable manner as by bolts 47 threadedly extending through the longitudinal central portion 48 of such bottom plate and into a similar portion formed in the top plate 45. The two plates are formed to provide two longitudinal guideways 49,49 in which ride guide blocks 50,50 to which are secured the pedal axles 51,51 which extend out between the longitudinally extending spaces 52,52 between the two plates. Pivotally connected to the outwardly extending portions of the axles 51,51 are the pedals 53,53. The axles 51,51 project inwardly beyond the guide blocks 50 and each extend through two chains or belts 54,55 extending longitudinally through the pedal guide. The belt or chain 55 is wholly contained within the guide and is a continuous belt connected at its ends to two small free pulleys 56,56 supported for free rotational movement between the plates 45,46. The axles 51,51 are connected to opposite runs of the belt 55 and are thereby permanently connected to each other to require them to move in unison during their reciprocative movements, but in opposite directions. The axles 51,51 also extend through opposite runs of the belt 54 which is also a continuous belt and one end of which extends around a pulley 57 mounted for free rotational movements between the plates 45,46 at the forward end of the pedal guide, The two runs of the belt 54 extend from the pulley 57 longitudinally of the pedal guide and pass out through the inner end of such guide and then over paired pulleys 60, 60 which rotate about an axis disposed at right angles to the axis of pulley 57. The pulleys 60,60 are mounted for free rotational movement on the bicycle frame member 14 at approximately the juncture of the frame members 10 and 14. As is shown in FIG. 4, the two runs of the belt 54 extend from the double pulley 60 and along the length of the frame member 14 to a pair of sprocket wheels 61,61' mounted on the axle 62 of the rear wheel 15 (note FIG. 5). The two runs of the belt 54 pass over and around both sprocket wheels 61,61' and toward a tension pulley 63 which supports the other end of such belt. The tension pulley 63 is mounted for free rotational movement on a suitable holder 64 which is connected by a tension spring 65 to the frame member 14. The location and force of spring 65 are such that the cyclist is enabled to shift the belt 54 from the sprocket wheels 61,61' in the event that additional change speed sprocket wheels are utilized in the bicycle, such as, for example, the change speed sprocket wheels 66,66' shown in FIG. 5 of the drawings. The sprocket wheels 61,61', 66 and 66' are of a type known to the art which enables them to drive the rear wheel axle 62 in one direction and enables them to rotate freely in the opposite direction without effecting the driven movement imparted to the axle 62 and rear wheel 15. As in the case of the front wheel shaft, the ends of the rear wheel shaft or axle 62 are conically shaped and without threads and are engaged by the legs 77 of the forked end of the frame member 14 whose inherent tendency to resist any pressure tending to separate them maintain the parts mounted in such axle in proper position thereon.

The chain or belt 54 may be of any known construction capable of performing the functions of the invention, but it is preferably made of a suitable type of known flexible plastic material having extending throughout the length of the belt body of such material, a plurality of nonstretchable cords 68, in FIG. 6, of any suitable material. The plastic material belt 54 is formed so that teeth 69 for meshing with the teeth of the sprocket wheels 61,61', 66,66', are provided thereon for a portion only of its length, namely, that portion 70 of the belt which will engage with such sprocket wheels in the reciprocating movements of the belt. The remaining portion 71 of the belt will be a smooth belt of ordinary beltlike configuration and without teeth. It will be noted in FIG. 6 that the nonstretchable cords 68 are located within the plastic body of the belt so that they are positioned nearer to the roots of the teeth 69 in the portion 70 of such belt, and nearer to the inner face of the belt in the portion 71 thereof, then they are to the outer face of such belt. At the places where the pedal axles 51 extend through the part of the belt portion 71 contained within the pedal mechanism 12, such belt portion is enlarged and holes 72,72, in FIG. 3, formed therein to receive such axles 51. The pedals 53 associated with the axles are provided with heel shoulders 53' to prevent the cyclist's feet from slipping downwardly.

The change speed mechanism for shifting the belt 54 from sprocket wheels 61,61' to sprocket wheels 66,66' and vice versa, is operable to effect such changes while the chain 54 and the corresponding sprocket wheels 61,61' are running backwardly. As is shown in FIGS. 5 and 6, such mechanism may comprise two levers 75,75' pivotally supported on the upper ends of bracket members 76,76 secured to the lower legs 77,77 of the forked frame member 14. The levers 75,75' which are located above the forked legs 77,77, are provided at their lower ends with U-shaped guides 78,78 which surround the runs of the belt 54. Extending through openings in the upper ends of the levers 75,75' is the lower end of a suitable actuating wire 80 which extends up along the frame member and is connected to a suitable lever (not shown) provided on the handlebar 19 in a well known manner. ONe end of the wire 80 is secured in any suitable fashion, as by soldering to lever 75. Mounted on the portion of the wire between levers 75,75' is a compression spring 81 which normally tends to maintain the upper ends of such levers in spread condition, Secured at its upper end to the wire 80 and bearing against the outer face of lever 75' is a compression spring 82 in the form of a casing known as a "Bowden wire." It will be understood that when the wire 80 is moved upwardly by actuating the associated lever on the handlebar, such pull by the wire 80 on lever 75 and the compression force exerted on lever 75' by the spring 82 will cause such levers to rotate about their pivots to move the belt runs from the sprocket wheels 66,66' to the sprocket wheels 61,61'. In this condition of the parts the spring 81 is under tension. When the handlebar lever is actuated to move the wire 80 downwardly, lever 75 will be pivoted by such wire and lever 75' will be pivoted by spring 81 to move the belt runs back to the sprocket wheels 61,61', as shown.

The numeral 85 indicates generally a detachable, transparent, plastic bubble or canopy that may be utilized with the cycle of this invention during inclement weather. As will be observed from FIGS. 1 and 7 of the drawings, the canopy 85 has a generally footlike configuration in side view and has an inverted U-shape in cross section to afford room for the cyclist in operating the bicycle and at the same time protect him from the top, front and sides while riding. The rear and bottom sides of the canopy are open to enable the cyclist to enter into the canopy to mount the bicycle. This opening is continuous from the point 86 at the top rear of the canopy, down the rear of such canopy and along the bottom thereof to the point 87. It will be noted that the two sides of the canopy extend down substantially below the main frame member 10 so that the rider is entirely protected against the weather. The edges 88 of the canopy along the rear and bottom opening may be rolled, as indicated, to prevent injury in the use of the canopy. To facilitate the cylist's mounting and unmounting, the bicycle, the canopy 85 is supported on the latter so that it may be tilted from the solid line position in FIG. 1 to the dotted line position thereof shown in such FIG. This tilting action is accomplished about the axis of a shaft 89 rotatably supported above the pedaling mechanism 12 by a bearing 90 carried by a bearing bracket generally designated 91 and mounted on the main frame member 10. The toe of the canopy extends beyond the forward end of the pedaling mechanism 12 and is configured so that when the canopy 85 is tilted forwardly such toe will not interfere with such mechanism. When the canopy is closed, its rear end rests on the saddle 11 in the manner shown more clearly in FIG. 7 of the drawings. As is shown in such FIG., the rear bottom end portions of the two sides of the canopy are each provided with an interior roller 94 adapted to rest on a side edge of the saddle 11. The rollers 94 are mounted for free rotational movement on headed pins 95 whose threaded ends extend through the plastic material of the canopy sides and are clamped thereto by inner and outer locknuts 96,97, respectively, threaddedly engaged with such pin ends.

It is believed it will be apparent from the foregoing description of the construction of the bicycle shown in FIGS. 1—7, that in operating the same, the cylist will position his legs and thighs almost horizontal because the saddle 11 and pedaling mechanism are both mounted on a frame member 10 which is disposed at an angle of approximately 18° to the horizontal. In mounting the bicycle, the cyclist sits on the saddle 11 and while so seated presses with one foot on a pedal 53 while retaining the other foot on the ground. As the cyclist forces his foot forwardly on such pedal the associated run of chain 54 will make the sprocket wheel on the rear wheel 15 to which it is connected revolve in a direction to drive the rear wheel 15 and consequently impel the bicycle forwardly. At the same time, the other run of the chain and its associated sprocket wheel will move in opposite directions, without effecting the forward movements of the rear wheel 15 and the bicycle. As soon as the bicycle starts moving, the rider applies both feet to the pedals 53 and thereafter proceeds by pumping with alternate reciprocating movements on such pedals. The frame members 10 and 14 are not rigid, but have an inherent resiliency which permits of rather free movements of either the cyclist or the rear wheel relative to each other about the juncture of such members as an axis while the bicycle is in operation; thereby permitting of a more cushioned ride than is possible in ordinary bicycle constructions.

FIG. 8 illustrates how the invention may be utilized in a collapsible portable bicycle. As in the construction disclosed in FIGS. 1—7, the embodiment of FIG. 8 includes a main frame member 10 on the upper end of which is mounted the saddle 11 and on the lower front end of which is mounted the pedal mechanism 12. Connected to the frame member 10 is the forked frame member 14 on which the rear wheel 15 and its associated parts are mounted. The pedaling mechanism 12 is connected to the sprocket wheels in the rear wheel shaft in a manner substantially similar to that described with respect to the embodiment of FIGS. 1—7. Connected also to the main frame member 10 is a sleeve 18 to which is detachably connected the steering column 17 and handlebars 19, such column being detachably connected, as by a key joint, and controlling the movements of a front wheel fork 34 of the type previously described, or one of more customary construction such as the fork 34' shown in FIG. 8.

In a collapsible type of bicycle, the frame members 10 and 14 may each be made in a manner previously described, or may be made of paired tubings, such as aluminum tubing, to make the bicycle as light as possible. FIG. 9 of the drawings shows a partial rear view of a cycle embodying the invention and in which the frame members 10' and 14' are made of paired tubings. It will be noted that the embodiment of FIG. 8 differs from that of FIGS. 1—7, in the respect that the frame member 14 is connected to the upper end of frame member 10 by a hinged joint which may be composed of a substantial hinging pin 100 extending through openings provided in the connected ends of such frame members. The saddle 11 may be mounted on the hinge pin 100 by wrapping steel rods or heavy wires 101 about the outer ends of such pin and anchoring one end of such rods on the frame member 14. The other ends of the rods 101 may be connected together by a half hinge plate 28 which is associated with half hinge members 27 formed in the base of the saddle in the manner previously explained.

Adjacent to its pivotal connection with the top of the frame member 14, the frame member 10 may be provided with two spaced ears 103 each of which supports a pulley shaft 104 and pulleys 105 freely rotatable on such shaft. The pulleys 105, like the pulleys 60 in FIG. 1, carry the chain or belt 54 connecting the pedal mechanism 12 to the sprocket wheels 106 associated with the rear wheel 15. Instead of using the type of chain 54 utilized in the embodiment of FIG. 1, a fine steel cable may be employed to effect a further reduction in the weight of the bicycle. When using such a cable, the rear wheel pulleys which are constructed to be freely rotatable in the counterclockwise direction, would be employed instead of the sprocket wheels 61,61' in the embodiment of FIGS. 1—7. Such rear wheel pulleys should each be provided on its periphery with a spiral groove for receiving and guiding such cable, such as the groove 116 in the pulleys 106' shown in FIG. 9, and the cable will be wrapped at least one complete turn around each of such pulleys.

The lower forked ends of the frame member 14 are provided with hooked ends 107 to receive the rear wheel shaft 62 which may be secured in position wherein in any suitable manner. Above the hooked ends 107 thereof, the lower forked ends of the frame member 14 are provided with ears 109 to which are pivotally connected the forked ends 110 of an extendable frame member 111 the other end of which is pivotally connected to an ear 112 provided on the steering sleeve 18. Thus, the frame members 10, 14 and 111 form a body frame of substantially triangular configuration, with the frame member 111 forming the base of the triangle. The frame member 111 is provided intermediate its length with a length adjusting device, such as the turnbuckle 114 in FIG. 8, to enable the frame body to be adjusted as to length so as to adjust the height of the saddle relative to the ground, the frame member 111 is also provided intermediate its length with a hinge 113 which enables such frame member to be folded upwardly as shown in dotted lines in FIG. 8, to bring the front wheel 16 into position close to the rear wheel 15. When so collapsed and the steering column detached, the bicycle can be readily stored in a relatively small storage area such as is provided in a standard automobile.

While I have illustrated and described preferred embodiments of my invention, it will be apparent to those skilled in the art that various modifications may be made therein without departing from the spirit of the invention or the scope of the appended claims.

I claim:

1. A cycle comprising a frame, a steering front wheel and a rear wheel mounted on said frame, steering means including a handle for operating the steering wheel, a saddle mounted on said frame in rear of said handle, pedaling mechanism mounted on said frame in front of said handle, said pedaling mechanism including guide means disposed generally longitudinally of the cycle, cyclist foot pedal means reciprocatably mounted on said guide means, and reciprocating driving means driven by the reciprocating movements of said pedal means and drivingly connected to said rear wheel, in which said driving means comprises two foot pedal devices, two lengths of chain connected to said devices and extending from said pedaling mechanism to said rear wheel, a pair of rotatable members mounted on the axle of said rear wheel and engaged by said chain lengths, said rotatable members being constructed to drive said rear wheel when their associated chain lengths are reciprocated in one direction by said pedaling mechanism and to rotate freely relative to the axle of said rear wheel when their associated chain lengths are reciprocated in the opposite direction by said pedaling mechanism, and means for maintaining said chain lengths under tension in their reciprocating movement, and said rotatable members are sprocket wheels, and in which said two lengths of chain form the two runs of a continuous length of chain, said chain runs throughout their range of engagement with said sprocket wheels being provided with teeth interengageable with the teeth on said sprocket wheels, and throughout the remainder of their lengths being toothless.

2. A cycle as defined in claim 1 in which said frame includes a longitudinal inclined frame member, in which said steering means includes a steering column connecting said handle to said front wheel and rotatably mounted on said frame member, and in which said saddle and said pedaling mechanism are mounted on said frame member so that the legs of a seated cyclist are generally longitudinally inclined and straddle said steering column above said front wheel.

3. A cycle as defined in claim 1, in which said saddle has a greater width then length and has a relatively plane front edge and a relatively deep rear side affording a backing for the cyclist as he reciprocates the pedaling mechanism.

4. A cycle as defined in claim 3, in which said saddle has mounted thereon a raised back rest for the cyclist.

5. A cycle as defined in claim 1, in which said steering means includes a steering column rotatably connected to said frame and a front wheel fork connected to said steering column, said front wheel fork being composed of a resilient strip of metal having an arcuate lengthwise configuration and split upwardly from its bottom to form a fork for receiving the front wheel, the unsplit upper end of said strip being secured to said steering column.

6. A cycle as defined in claim 1, including a canopy enclosing the upper end of said frame, said saddle and said pedaling mechanism, and being transparent in the upper portion at least to enable the cyclist to observe his progress, means mounted on said frame in front of said handle for pivotally supporting said canopy, and means on said canopy to support the rear end thereof on said saddle.

7. A cycle as defined in claim 1, in which said frame comprises a first longitudinal, inclined frame member on which is mounted said saddle and said pedaling mechanism, and a second rear wheel frame member connected at its upper end to said first frame member, said saddle being located to the rear of said place of connection of said frame members, and said front wheel being located below said pedaling mechanism and of smaller diameter than said rear wheel.

8. A cycle as defined in claim 6, in which said second frame member is pivotally connected to said first frame member, and a third frame member pivotally connected at its rear end to the lower end of said second frame member and pivotally connected at its other forward end to said steering means to provide said frame with a substantially triangular configuration, said third frame member being hinged intermediate its length to enable it to be folded to bring the front and rear wheels adjacent to each other.

9. A cycle as defined in claim 8, in which said third frame member is extendable and includes means operable to vary the length of said member and thereby to adjust the height of said saddle relative to the ground.

10. A cycle as defined in claim 7, in which said driving means comprises two lengths of chain extending from said pedaling mechanism to said rear wheel, chain engageable rotatable members mounted on the axle of said rear wheel on each side of such rear wheel and forming part of a change speed mechanism, a pair of speed-changing levers for shifting said chain lengths in relation to said rotatable members, mounted upon and located above the lower end of said second frame member, and means operable by the cyclist for simultaneously operating both levers to effect a simultaneous shift of said chain lengths.

11. A cycle as defined in claim 10, in which said rotatable members are constructed to drive said rear wheel when their associated chain lengths are reciprocated in one direction by said pedaling mechanism and to rotate freely relative to the rear wheel axle when their associated chain lengths are reciprocated in the opposite direction by said pedaling mechanism, said cyclist operable means being operable when said chain lengths are reciprocated in said opposite direction to effect the shift of said chain lengths.

12. A cycle as defined in claim 2, in which said frame includes a second frame member connected at one end to said inclined frame member and rearwardly of said place of connection forming with said inclined frame member a horizontally disposed V, said rear wheel being mounted on the other end of said second frame member, and said saddle being mounted on the rear end of said inclined frame member, said second frame member and said inclined frame member rearwardly of said place of connection being constructed to have an inherent resiliency such as to enable relative movement therebetween in the operation of the cycle.